(12) United States Patent
van der Westhuizen et al.

(10) Patent No.: US 9,079,659 B2
(45) Date of Patent: Jul. 14, 2015

(54) ROTOR HUB AND BLADE ROOT FAIRING APPARATUS AND METHOD

(75) Inventors: Jacob J. van der Westhuizen, South Jordan, UT (US); Robert Owen White, Orillia (CA)

(73) Assignee: General Aeronautics Corporation, Inc., Salt Lake City, UT (US)

( * ) Notice: Subject to any disclaimer, the term of this patent is extended or adjusted under 35 U.S.C. 154(b) by 406 days.

(21) Appl. No.: 13/427,696

(22) Filed: Mar. 22, 2012
(Under 37 CFR 1.47)

(65) Prior Publication Data
US 2012/0175461 A1   Jul. 12, 2012

Related U.S. Application Data

(60) Provisional application No. 61/466,177, filed on Mar. 22, 2011.

(51) Int. Cl.
*B64C 27/48*   (2006.01)
*B64C 27/32*   (2006.01)
*B64C 27/02*   (2006.01)

(52) U.S. Cl.
CPC .............. *B64C 27/48* (2013.01); *B64C 27/025* (2013.01); *B64C 27/32* (2013.01)

(58) Field of Classification Search
CPC ................................. B64C 27/32; B64C 27/48
USPC ........ 244/6, 7 R, 8, 17.11, 17.23, 17.25, 130; 416/244 R, 245 R, 245 A, 244 A, 244 B
See application file for complete search history.

(56) References Cited

U.S. PATENT DOCUMENTS

| | | | | |
|---|---|---|---|---|
| 2,373,825 A | * | 4/1945 | Grady | 416/168 R |
| 2,601,463 A | | 6/1952 | Stanley | |
| 2,810,443 A | * | 10/1957 | Doman | 416/102 |
| 3,007,654 A | * | 11/1961 | Doman | 244/17.11 |
| 3,331,444 A | * | 7/1967 | Toner | 416/245 R |
| 3,409,248 A | * | 11/1968 | Bryan | 244/6 |
| 3,494,424 A | | 2/1970 | Stanley | |
| 3,744,743 A | * | 7/1973 | Nay et al. | 244/17.11 |
| 4,212,588 A | * | 7/1980 | Fradenburgh | 416/141 |
| 4,589,611 A | | 5/1986 | Ramme et al. | |
| 5,934,873 A | | 8/1999 | Greene | |
| 6,062,508 A | * | 5/2000 | Black | 244/8 |

(Continued)

FOREIGN PATENT DOCUMENTS

EP   2727832 A1 *  5/2014

OTHER PUBLICATIONS

Harris et al., The XV-1's Rotor System, AHS International, Jan. 21-24, 2004.

(Continued)

*Primary Examiner* — Joseph W Sanderson
(74) *Attorney, Agent, or Firm* — Pate Baird, PLLC

(57) ABSTRACT

A fairing system may be assembled about a rotor of a rotorcraft to present an aerodynamically quasi-static region that rotates in an airstream, as well as certain extensions that sweep through the airstream as the rotor hub passes through the air. A spherical interface between the extensions on the rotor hub fairing and the base or root portion of each blade fairing provides three degrees of freedom permitting lead-lag, flapping, and blade pitch pivoting in the blade, while still maintaining an aerodynamic profile that will minimize drag.

20 Claims, 15 Drawing Sheets

(56) References Cited

U.S. PATENT DOCUMENTS

| | | | |
|---|---|---|---|
| 7,147,182 B1 | 12/2006 | Flanigan | |
| 7,607,607 B2* | 10/2009 | Darrow et al. | 244/17.19 |
| 7,621,480 B2* | 11/2009 | Darrow et al. | 244/17.19 |
| 7,871,034 B2* | 1/2011 | Karem | 244/7 A |
| 2007/0181741 A1* | 8/2007 | Darrow et al. | 244/17.23 |
| 2009/0084891 A1* | 4/2009 | Darrow et al. | 244/17.19 |
| 2009/0097973 A1* | 4/2009 | Cabrera et al. | 416/1 |
| 2009/0148291 A1* | 6/2009 | Gerber et al. | 416/147 |
| 2009/0220341 A1* | 9/2009 | Schmaling et al. | 416/114 |
| 2009/0304511 A1* | 12/2009 | Brannon, III | 416/179 |
| 2012/0219417 A1* | 8/2012 | Podgurski | 416/1 |
| 2014/0021290 A1* | 1/2014 | Chrestensen et al. | 244/17.11 |

OTHER PUBLICATIONS

Franklin D. Harris, An Overview of Autogyros and the McDonnell XV-1 Convertiplane, NASA CR, Oct. 2003.

David H. Hickey, NACA Research Memorandum, Full Scale Wind Tunnel Tests, National Advisory Committee for Aeronautics, May 17, 1956.

S. Coham et al, XV-9A Hot Cycle Research Aircraft Program Summary Report, U.S. Army Aviation Material Laboratories, Fort Eustis, Virginia, Jun. 1966.

D. M. Martin et al., Experimental Investigation of Advance Hub and Pylon Fairing Configurations to Reduce Helicopter Drag, NASA Technical Memorandum 4540, Sep. 1993.

* cited by examiner

B-B

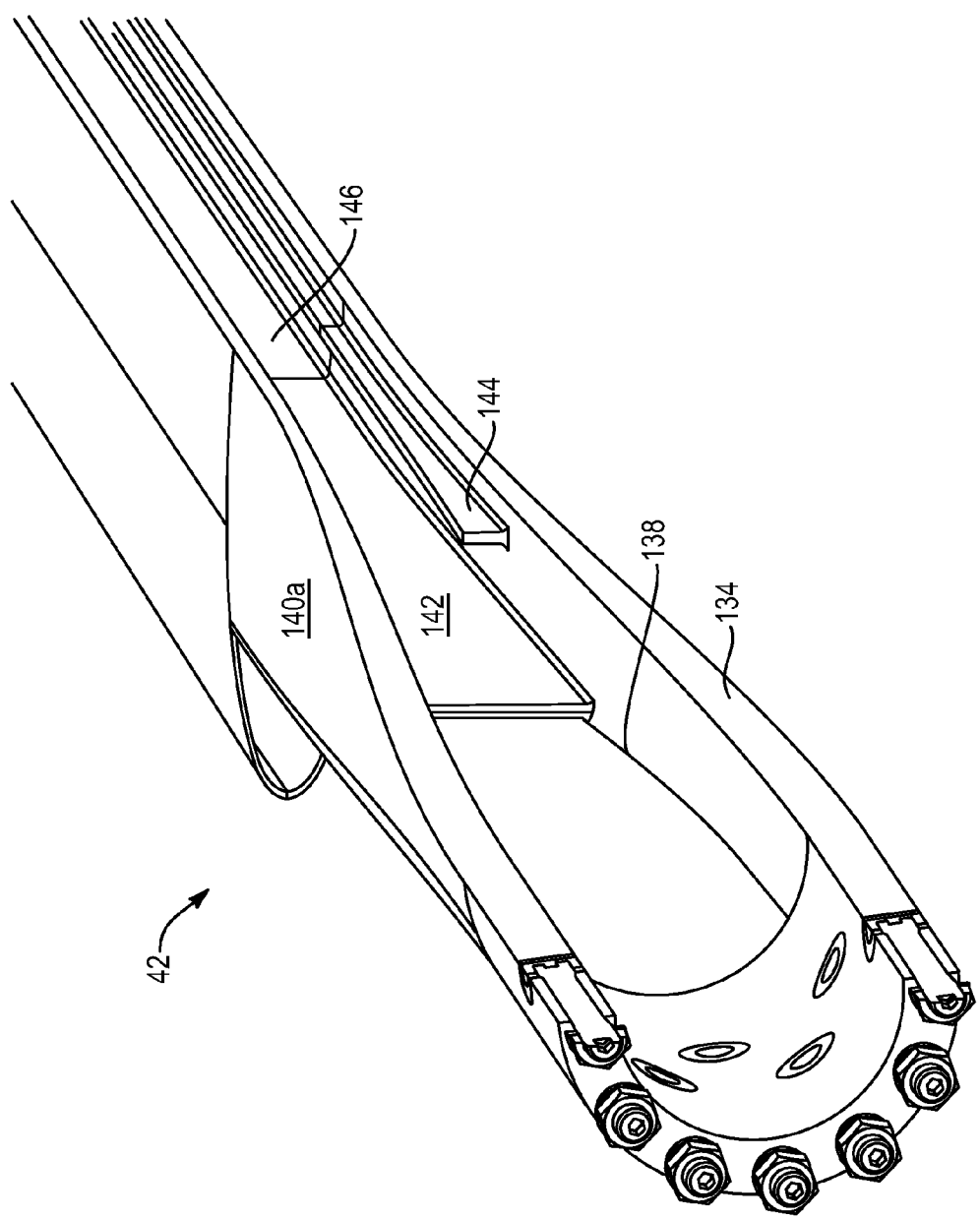

ROTOR HUB AND BLADE ROOT FAIRING APPARATUS AND METHOD

RELATED APPLICATIONS

This application claims the benefit of U.S. Provisional Patent Application Ser. No. 61/466,177, filed on Mar. 22, 2011, which is hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

BACKGROUND

1. The Field of the Invention

This invention relates to rotating wing aircraft, and, more particularly to rotating wing aircraft relying on autorotation of a rotor to provide lift, and systems and methods for improving aerodynamics of a rotorcraft airframe.

2. The Background Art

Rotating wing aircraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotating wing aircraft can take off and land vertically or along short runways inasmuch as powered rotation of the rotating wing provides the needed lift. This makes rotating wing aircraft particularly useful for landing in urban locations or undeveloped areas without a proper runway.

The most common rotating wing aircraft in use today are helicopters. A helicopter typically includes a fuselage, housing an engine and passenger compartment, and a rotor, driven by the engine, to provide lift. Forced rotation of the rotor causes a reactive torque on the fuselage. Accordingly, conventional helicopters require either two counter rotating rotors or a tail rotor in order to counteract this reactive torque.

Another type of rotating wing aircraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e. autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 convertiplane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

Although rotating wing aircraft provide the significant advantage of vertical takeoff and landing (VTOL), they are much more limited in their maximum flight speed than are fixed wing aircraft. The primary reason that prior rotating wing aircraft are unable to achieve high flight speed is a phenomenon known as "retreating blade stall." As the fuselage of the rotating wing aircraft moves in a flight direction, rotation of the rotor causes each blade thereof to be either "advancing" or "retreating."

That is, in a fixed-wing aircraft, all wings move forward in fixed relation, with the fuselage. In a rotary-wing aircraft, the fuselage moves forward with respect to the air. However, rotor blades on both sides move with respect to the fuselage. Thus, the velocity of any point on any blade is the velocity of that point, with respect to the fuselage, plus the velocity of the fuselage. A blade is advancing if it is moving in the same direction as the flight direction. A blade is retreating if it is moving opposite the flight direction.

The rotor blades are airfoils that provide lift that depends on the speed of air flow thereover. The advancing blade therefore experiences much greater lift than the retreating blade. One technical solutions to this problem is that the blades of the rotors are allowed to "flap." That is, the advancing blade is allowed to fly or flap upward in response to the increased air speed thereover such that its blade angle of attack is reduced. This reduces the lift exerted on the blade. The retreating blade experiences less air speed and tends to fly or flap downward such that its blade angle of attack is increased, which increases the lift exerted on the blade.

Flap enables rotating wing aircraft to travel in a direction perpendicular to the axis of rotation of the rotor. However, lift equalization due to flapping is limited by a phenomenon known as "retreating blade stall." As noted above, flapping of the rotor blades increases the angle of attack of the retreating blade. However, at certain higher speeds, the increase in the blade angle of attack required to equalize lift on the advancing and retreating blades results in loss of lift (stalling) of the retreating blade.

A second limit on the speed of rotating wing aircraft is the drag at the tips of the rotor. The tip of the advancing blade is moving at a speed equal to the speed of the aircraft and relative to the air, plus the speed of the tip of the blade with respect to the aircraft. That is equal to the sum of the flight speed of the rotating wing aircraft plus the product of the length of the blade and the angular velocity of the rotor. In helicopters, the rotor is forced to rotate in order to provide both upward lift and thrust in the direction of flight. Increasing the speed of a helicopter therefore increases the air speed at the rotor or blade tip, both because of the increased flight speed and the increased angular velocity of the rotors required to provide supporting thrust.

The air speed over the tip of the advancing blade can therefore exceed the speed of sound even though the flight speed is actually much less. As the air speed over the tip approaches the speed of sound, the drag on the blade becomes greater than the engine can overcome. In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotating wing aircraft is reverse air flow over the retreating blade. As noted above, the retreating blade is traveling opposite the flight direction with respect to the fuselage. At certain high speeds, portions of the retreating blade are moving rearward, with respect to the fuselage, slower than the flight speed of the fuselage. Accordingly, the direction of air flow over these portions of the retreating blade is reversed from that typically designed to generate positive lift. Air flow may instead generate a negative lift, or downward force, on the retreating blade. For example, if the blade angle of attack is upward with respect to wind velocity, but wind is moving over the wing in a reverse direction, the blade may experience negative lift.

The ratio of the maximum air speed of a rotating wing aircraft to the maximum air speed of the tips of the rotor blades is known as the "advance ratio. The maximum advance ratio of rotary wing aircraft available today is less than 0.5, which generally limits the top flight speed of rotary wing aircraft to less than 200 miles per hour (mph). For most helicopters, that maximum achievable advance ratio is between about 0.3 and 0.4.

In view of the foregoing, it would be an advancement in the art to provide a rotating wing aircraft capable of vertical takeoff and landing and flight speeds in excess of 200 mph.

At high advance ratios, the drag on the rotor blades near their roots, as well as the drag on the various apparatus within the rotor hub itself become even more significant. In helicopters and autogyros, rotor drag can be a significant fraction of the overall drag on the aircraft. As advance ratios increase, the drag caused by the rotor may be a significant consumer of power. Up to 25 percent of the overall drag on the aircraft is contemplated.

Accordingly, it would be an advance in the art to provide a mechanism for reducing the drag on a rotor, particularly near the root of each rotor blade, as well as for the rotor hub at the center of the rotor. It would further be an advance in the art to provide a minimized drag coefficient, while still supporting or containing all of the necessary functionality and mechanisms required to operate the rotor blades. It would be a further advance in the art to provide a reduction in aerodynamic drag for support systems, actuators, connectors, and the like transferring any materials, forces, information, actuation, or the like from an aircraft, through a rotor hub, and out to a rotor blade.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

Aerodynamic drag is a principle of momentum transfer. In order for a fluid, such as air, to pass by a solid object, the air must change its path to circumnavigate the object. As a direct result, the direction and velocity of the air change. Therefore, a momentum transfer must occur between the solid object and the fluid flow, such as the air.

That momentum transfer amounts to force imposed by the air stream against the solid object. Likewise, the solid object resists with that same force. Accordingly, the force, acting through some time period, changes the momentum of the airflow. Meanwhile, the airflow by being exposed to that force, and resisting with its own force, transfers a force to the object.

This force transferred to a solid object, whether fixed or moving, is related directly to the relative velocity existing between the solid object and the airstream. For example, an airstream may be moving, while an object is fixed in that airstream. Likewise, an object may be moving through still air, thus imposing a relative velocity on the surrounding still air with respect to the solid object. Similarly, an object may be moving in a moving airstream.

Accordingly, the significant velocity is the relative velocity. Relative velocity the difference in velocities between the absolute velocity of the solid object, and the absolute velocity of the air.

In aircraft, aerodynamic drag is a significant concern. For example, on fixed wing aircraft, the wing shape, designed principally to provide lift, must always be designed with the consideration of aerodynamic drag. Since a wing cannot typically have zero projected area exposed to an airstream, it will have some amount of drag. When flaps are added, drag increases, although the effective chord of the wing in increases, and thus lift is increased. At low speeds, fixed wing aircraft employ flaps, such as during landing operations. At low speed, the drag is not so significant, because the velocity is reduced. Thus, the tradeoff between increased chord for increased lift, and the increased frontal projected area causing increased drag, provides in landing a net benefit with the use of flaps to increase lift.

Rotorcraft face similar issues. The rotary wings or blades are exposed to the relative velocity between themselves and the surrounding airflows. Likewise, rotor blades or rotary wings in a rotorcraft provide lift, but also experience drag.

One area of drag that is surprisingly great is the drag caused by the passage of the rotor hub during flight. The airframe may be covered up with a skin, to form a fuselage that passes through the air with less drag. However, the various mechanisms that operate the collective and cyclic pitch in rotorcraft, such as a helicopter for example, must continue to operate. Likewise, in a sophisticated heliplane or autogyro, drag forces through the rotor hub may be significant.

Typically, various shafts, lines, actuators, connectors, plates, and other components may be part of the rotor hub. Likewise, the root of each rotor blade must somehow connect to the hub. Connection of a rotor blade operating as an airfoil to a hub with its mechanical and control connections is a serious mechanical engineering enterprise. Providing the support for the blade, as well as the freedom of motion, with the other infrastructure may cause the root of the rotor blade to be shaped non-aerodynamically. Inasmuch as the portion of the rotor blade structure nearest the hub is not providing as significant a contribution to lift as other parts of the blade, the aerodynamics for contribution to lift may not be particularly valuable.

In one embodiment of an apparatus and method in accordance with the invention, a rotor cannot actually be completely enveloped in a static aerodynamic profile. For example, the drag on a sphere at the location of the hub would not significantly change when that sphere or rotor hub is rotating. Symmetry precludes such changes. Meanwhile, however, the blades are constantly changing their presented area while rotating. Accordingly, a system in accordance with the invention may provide a substantially static profile for at least a portion of the hub. A portion of the hub may be enveloped in a cowling or a fairing that effectively closes off the mechanical structures of the hub to the flow of air therethrough and past the hub components. Some portions may provide a static aerodynamic profile. Others may change presented (e.g., projected) area contributing to drag.

Likewise, since rotor blades are not static profiles, but rotate through the air, present a continually changing profile, they cannot have completely static aerodynamic profiles. Likewise, since they radiate outward, each position on a radius from the center of the hub outward acts at a different profile, and with a different velocity than every other location at almost all times. Moreover, due to the lead-lag tendencies of rotorcraft blades, a certain amount of flexure will occur in the lead-lag direction.

Meanwhile, the centrifugal forces within a blade tend to straighten the blade out by pulling all rotating portions of the blade away from the hub. This axial load on each blade also tends to counteract the tendency of each blade to flap.

Even where rigid materials and substantially rigid connections are used on a rotor blade, the rotor blade may still bend during its rotating cycle. Accordingly, a certain degree of vertical "flapping" motion exists between a root of a rotor blade, or the region of the blade near the root as a result of the flapping tendency of rotorcraft blades.

Finally, a rotor blade must pivot about a longitudinal axis in order to change its collective pitch, cyclic pitch, or both. Accordingly, that longitudinal axis or feathering axis will be an axis of motion, in a circumferential direction thereabout, by the blades. All of these motions must be, and are accommodated in a fairing system in accordance with the invention.

The fairing provides three degrees of freedom in an interface between a fairing secured to a blade near the root, and a fairing connected to a rotor hub. By providing a spherical interface between the substantially static profile of the fairing on the hub, and each moving blade fairing, the three degrees of freedom required in moving a blade can be accommodated without sacrificing aerodynamic contouring.

In certain embodiments, the blade pitch angles of rotation or angles of pivoting may be accommodated by a circular opening through which components of the blade root portion may secure to the hub. Meanwhile, the maximum beam bending and chord bending corresponding to flapping and lead-lag motion, respectively may be accommodated by the spherical interface at which the base or root of the blade fairing interfaces with a matching, spherical face on the hub fairing. At the interface between the hub fairing and the root fairing, a seal may provide flexibility and support relative motion between the root fairing or blade fairing and the hub fairing. The seal may be one of several types, typically a flexible seal, such as a blade or face seal contacting an inner surface of the root portion of the blade fairing. In other embodiments, a bellows seal or other mechanism may provide for stopping a flow through the joint or the spherical interface between the blade fairing and the root fairing. In this manner, the clearance, whatever it be, between the blade fairing and the hub fairing does not regularly pass airflow into the hub, and thus maintains a substantially static, thin region of air between the mated spherical surfaces.

In one embodiment of an apparatus and method in accordance with the invention, a plurality of rotor blades, typically two, four, or more may extend from a rotor hub radially outward. The hub may have a fairing surrounding its components. As each of the structural components connected to each blade root extend away from the hub, they may be covered with a projection or extension that leads to a blade root fairing on the blades.

At the extreme outermost radially extent of each projection or extension from the rotor hub fairing, a spherical surface is formed. At one location on that spherical surface, a frustum is created in which a seal holding ring may be formed. The opening will typically have a circular cross section as if a plane intersected with and removed a portion of the spherical surface.

In other embodiments, the spherical surface may be formed such that it only extends as a frustum as far as the seal holding ring. Through this seal-holding ring, all the components that extend outside the rotor hub fairing and pertain to the blade pass through the seal ring or seal opening at the end of the extension without contacting the fairing.

The seal between the rotor hub fairing and the blade fairing need not be a high velocity, rotating seal. Rather, the seal may be quasi-static, subject to motion, but not at particularly high rates of speed. Relative motion is due to cyclic pitch changes, flapping, and lead-lag motion of a blade. Thus, the seal ring is fitted with a seal, and the fairing for the blade is in contact with the seal. The spherical surfaces of the hub fairing and blade fairing may be spaced apart with no other seal therebetween. They will typically maintain a slight clearance as engineered (e.g. for material properties and tolerances) between the spherical surface of the rotor hub fairing and the internal spherical surface at the root of the blade fairing.

In one embodiment, the clearance between the spherical surfaces of the rotor fairing or rotor hub fairing and the blade fairing may be on the order of thousandths of a inch. In certain embodiments, the clearance may be between two and ten thousandths of an inch. In one presently contemplated embodiment, a clearance of about six thousandths has been deemed suitable as an offset between the spherical surfaces.

Likewise, a similar clearance may be provided between the innermost diameter of the seal ring and the components passing therethrough. Inasmuch as comparatively tight tolerances may be maintained, clearances may be engineered according to the aerodynamics desired and the tolerances provided for the interfacing components.

In certain embodiments currently contemplated, the seal between the blade fairing and the rotor hub fairing may actually be a bellows. For example, inasmuch as a blade might be configured to turn inside a blade fairing, a bellows may provide lead-lag as well as flapping flexure in the seal between the blade fairing and the hub fairing. In other embodiments, a sliding "wiper" seal surface may simply contact the inner surface of the spherical portion of a blade fairing, being secured around the seal ring portion of the hub fairing.

In certain embodiments, a bellows seal may be secured to the seal ring of the hub fairing and similarly connected fixably to an internal ring on the blade fairing. The bellows, typically formulated of a suitably flexible elastomer can then move in lead-lag, flapping, as well as pivoting motions. The bellows, in such a situation might be required to twist. However, suitable soft elastomeric materials and a suitable number of convolutions may provide for such an arrangement. In such an arrangement, the entire seal flexes, and yet is completely sealed at both ends, at the proximal end to the hub fairing and at the distal end to the blade fairing.

Regardless, the three degrees of freedom, although required to accommodate the relative motion between a rotor blade of a rotorcraft and the rotor hub thereof are not all the same size. For example, blade pitch control may vary from five to ninety degrees conceivably. More likely, blade pitch variation may typically only vary from about twenty to about forty-five degrees maximum. By contrast, flapping and lead-lag displacements of blade will typically be less than ten degrees.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 6A is a perspective view of the blade root that fits within the blade fairing;

DETAILED DESCRIPTION OF THE PREFERRED EMBODIMENTS

Figure 1:
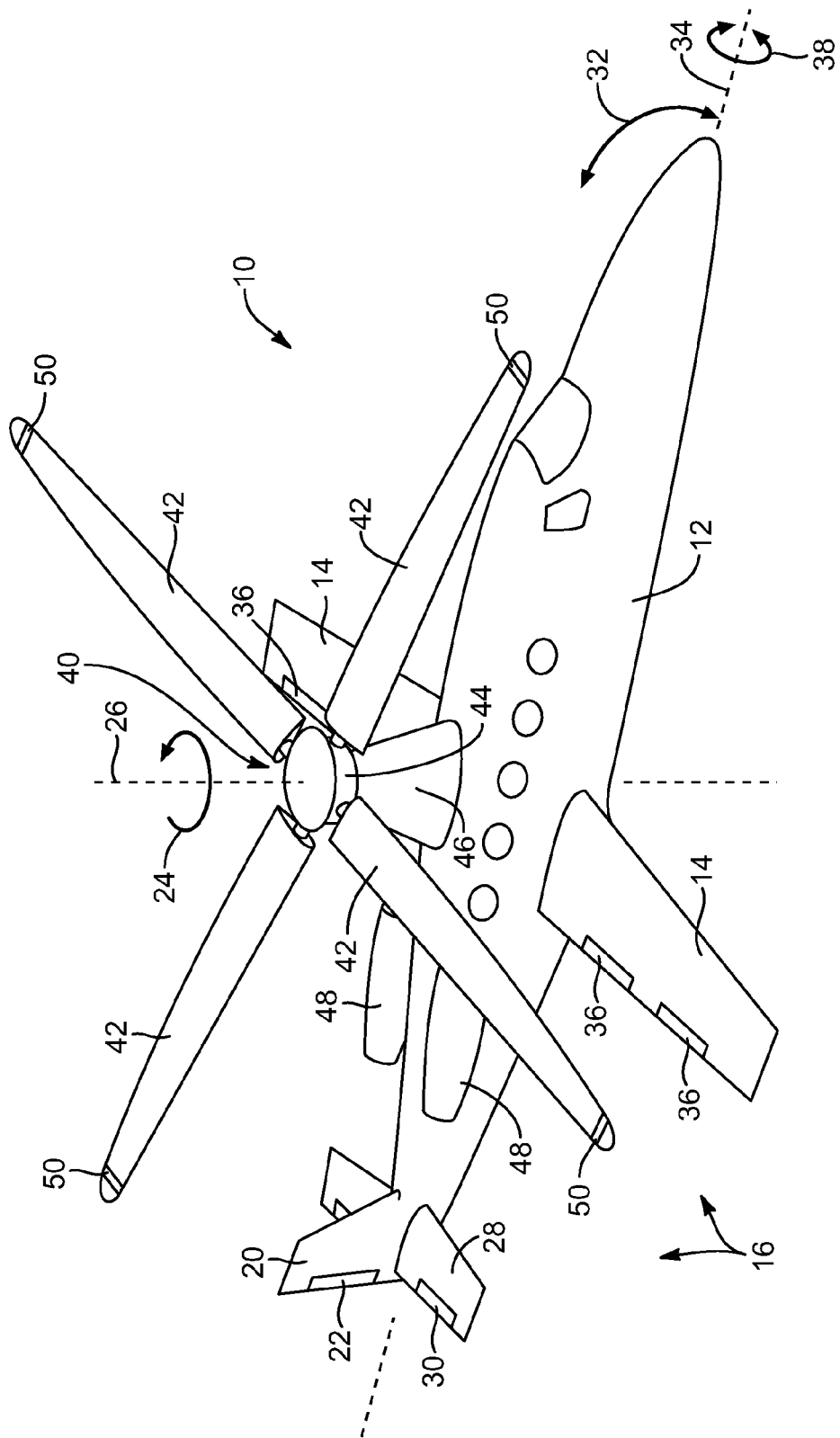
FIG. 1 is an isometric view of an aircraft in accordance with an embodiment of the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

This patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

Referring to FIG. 1, an aircraft 10 includes an airframe 12 or a fuselage 12 defining a cabin for carrying an operator, passengers, cargo, or the like. The airframe 12 may include one or more fixed wings 14 shaped as airfoils for providing lift to the aircraft. The wings 14 may be configured such that they provide sufficient lift to overcome the weight of the aircraft 10 only at comparatively high speeds inasmuch as the aircraft 10 is capable of vertical takeoff and landing (VTOL) and does not need lift from the fixed wings 14 at low speeds, e.g. below 50 mph or even 100 mph upon taking off.

In this manner, the wings 14 may be made smaller than those of fixed wing aircraft requiring a high velocity takeoff, which results in lower drag at higher velocities. In some embodiments the wings 14 provide sufficient lift to support at least 50 percent, preferably 90 percent, of the weight of the aircraft 10 at air speeds above 200 mph.

Control surfaces 16 may secure to one or both of the airframe 12 and wings 14. For example a tail structure 18 may include one or more vertical stabilizers 20 and one or more rudders 22. The rudders 22 may be adjustable as known in the art to control the yaw 24 of the aircraft 10 during flight. As known in the art, yaw 24 is defined as rotation about a vertical axis 26 of the aircraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable as known in the art to alter the pitch 32 of the aircraft 10. As known in the art, pitch 32 is defined as rotation in a plane containing the vertical axis 26 and a longitudinal axis 34 of the airframe of an aircraft 10. In the illustrated embodiment, the elevator 30 is a hinged portion of the horizontal stabilizer 28. In some embodiments, twin rudders 22 may be positioned at an angle relative to the vertical axis 26 and serve both to adjust the yaw 24 and pitch 32 of the aircraft 10.

The control surfaces 16 may also include ailerons 36 on the wings 14. As known in the art, ailerons 36 are used to control roll 38 of the airplane. As known in the art, roll 38 is defined as rotation about the longitudinal axis 34 of the aircraft 10.

Lift during vertical takeoff and landing and for augmenting lift of the wings 14 during flight is provided by a rotor 40 comprising a number of individual blades 42. The blades are mounted to a rotor hub 44. The hub 44 is coupled to a mast 46 which couples the rotor hub 44 to the airframe 12. The rotor 40 may be selectively powered by one or more engines 48 housed in the airframe 12, or adjacent nacelles, and coupled to the rotor 40. In some embodiments, jets 50 located at or near the tips of the blades 42 power the rotor 40 during takeoff, landing, hovering, or when the flight speed of the aircraft is insufficient to provide sufficient autorotation to develop needed lift.

Figure 2:
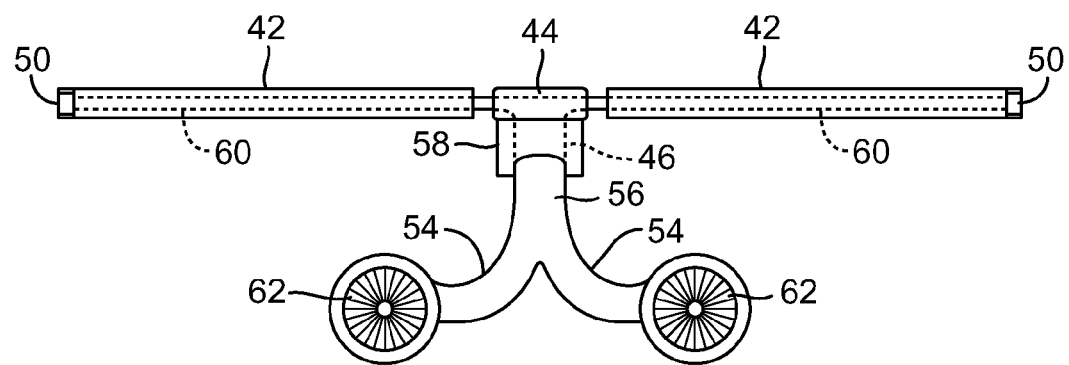
FIG. 2 is a front elevation view of a compressed or otherwise pressurized air supply for a tip jet in accordance with an embodiment of the present invention.

Referring to FIG. 2, while still referring to FIG. 1, in the illustrated embodiment, the engines 48 may be embodied as jet engines 48 that provide thrust during flight of the aircraft. The jet engines 48 may additionally supply compressed air to the jets 46 by driving a bypass turbine 62 or auxiliary compressor. Air compressed by the bypass turbine 62 may be transmitted through ducts 54 to a plenum 56 in fluid communication with the ducts 54.

The plenum 56 is in fluid communication with the mast 46 that is hollow or has another passage to provide for air conduction. A mast fairing 58 positioned around the mast 46 may provide one or both of an air channel and a low drag profile for the mast 46. The mast 46 or mast fairing 58 is in fluid communication with the rotor hub 44. The rotor hub 44 is in fluid communication with blade ducts 60 extending longitudinally through the blades 42 to feed the tip jets 50.

Figure 3A:
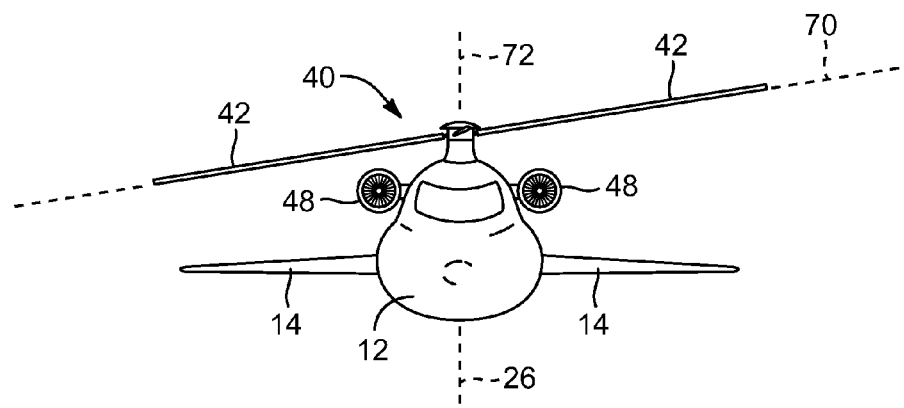
FIG. 3A is a front elevation view of a rotor craft illustrating operational parameters describing a rotor configuration suitable for use in accordance with embodiments of an apparatus and method in accordance with the present invention and the system of FIGS. 1 and 2 in particular.
Figure 3B:
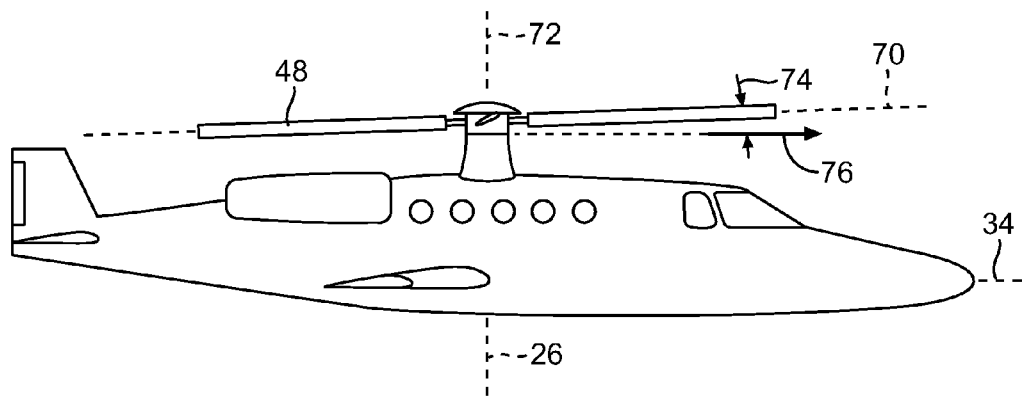
FIG. 3B is a right side elevation view of the rotor craft of FIG. 3A.
Figure 3C:
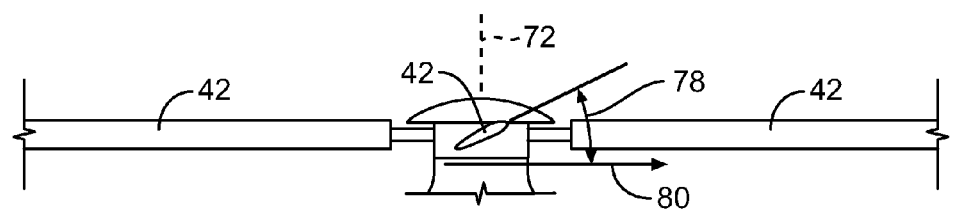
FIG. 3C is a partial cut of a right side elevation view of the rotor of FIG. 3A.
Figure 4:
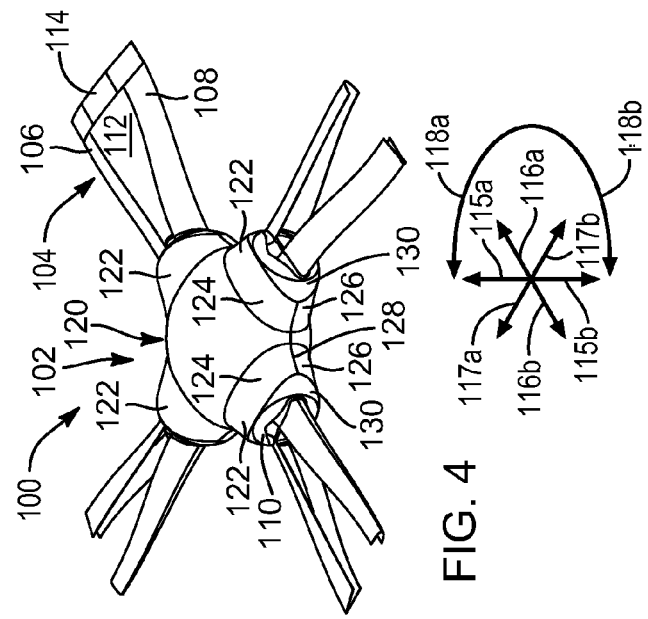
FIG. 4 is a perspective view of one embodiment of a fairing system for a hub and blades of a rotorcraft.

Referring to FIGS. 3A-3C, rotation of the rotor 40 about its axis of rotation 72 occurs in a rotor disc 70 that is generally planar but may be contoured due to flexing of the blades 42 during flight. In general, the rotor disc 70 may be defined as a plane in which the tips of the blades 42 travel. Inasmuch as the blades 42 flap cyclically upward and downward due to changes in lift while advancing and retreating, the rotor disc 70 is angled with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the angle of attack 74 or rotor disk angle of attack 74. For purposes of this application, flight direction 76 and air speed refer to the direction and speed, respectively, of the airframe 12 of the aircraft 10 relative to surrounding air. In autogyro systems, the angle of attack 74 of the rotor disc 70 is generally positive in order to achieve autorotation of the rotor 40, which in turn generates lift.

Referring to FIG. 3C, the surfaces of the blades 42, and particularly the chord of each blade 42, define a pitch angle 78, or blade angle of attack 78, relative to the direction of movement 80 of the blades 42. In general, a higher pitch angle 78 will result in more lift and higher drag on the blade up to the point where stalling occurs, at which point lift has declined below a value necessary to sustain flight. the pitch angle 78 of the blade 42 may be controlled by both cyclic and collective pitch control as known in the art of rotary wing aircraft design.

Referring to FIGS. 4-7, specifically, while continuing to refer generally to FIGS. 1-16, a system 100 for fairing a rotorcraft rotor in accordance with the invention may include a hub portion 102 or hub fairing 102 from which one or more blade portions 104 or blade root fairings 104 extend. The hub fairing 102 covers the rotor hub 44 of the aircraft 10, while the blade portion 104 covers the area of the root of the blade 42 or rotary wing 42 closest to the hub 44.

In general, a system 100 may include an aerodynamic hub portion 102 designed to minimize aerodynamic drag while passing through air. Typically, portions of the hub fairing 102 may behave substantially as if it were a static device, and not a rotating device spinning with the hub 44 of the aircraft 10. Nevertheless, because the blades 42 extend from the hub 44, a blade portion 104 of the fairing system 100 may extend from an asymmetric or not universally planar symmetric fairing system 100.

Typically, the blade portion 104 may include a leading fairing 106, as well as a trailing fairing 108. The leading fairing 106 corresponds with the leading edge of the blade 42, advancing into the surrounding air. The trailing fairing 108 corresponds to the trailing edge of the blade that is following through the air.

In the illustrated embodiment, the blade portion 104 of the fairing system 100 includes a cuff 110. The cuff 110 has an internal surface that is substantially spherical.

Meanwhile, a central portion 112 of the blade portion 104 of the fairing system 100 may actually be a surface 112 fitted over a surface of the airfoil that is the blade 42. On the other hand, the central portion 112 may indeed simply be a carefully fitted portion of the blade 42 that together with the leading 106 and trailing 108 fairing portions forms a single, smooth, aerodynamic surface.

In the illustrated embodiment, the blade 42 or wing 42 of a rotorcraft 10 may typically have a portion that extends inward through the fairing system 100 to connect to the hub 44 within the hub portion 102 of the fairing system 100. Accordingly, the blade 42 or wing 42 may typically be formed as an airfoil shape. Nevertheless, in transitioning from what is substantially a circular cross-sectional geometry of a root passing into the hub portion 102, from an airfoil shape of the blade 42 itself, a transition region exists. Since a circular cross section does not form a body of particularly low aerodynamic drag, the leading 106 and trailing 108 fairing portions may transition from the geometry of the root of the blade 42 to something of a more aerodynamic shape.

In general, the fairing system 100 of the rotorcraft 10 may establish a coordinate system. In general, a direction 115 represents a nominal vertical axis through the mast and hub 44 of the rotorcraft 10. Thus, the direction 115a represents a vertical upward direction while the direction 115b represents a vertically downward direction, treating the axis of rotation 26 of the rotorcraft 10 as a nominal vertical axis. Accordingly, the vertical direction 115 extends along the axis 26 of rotation of the rotor 40 of the rotorcraft 10.

Likewise, a longitudinal direction 116 along a blade 42 is represented as traversing from a center of rotation away from the hub 44 in a direction 116a, and traversing opposite in a direction 116b. Similarly, a lead-lag direction 117 represents a direction 117a advancing in the direction toward the leading edge or leading fairing 106, while the direction 117b passes from the leading fairing 106 toward the trailing fairing 108, generally.

A circumferential direction 118 represents the flapping direction of motion of the blade 42, and thus the blade fairing 104 or the blade portion 104 of the fairing system 100. Another direction 118a is simply an upward or perhaps counterclockwise, circumferential direction with respect to an axis running along the length of a rotorcraft 10, while the direction 118b represents the opposite, clockwise rotation about a longitudinal axis of the airframe 12.

However, the circumferential direction 118 may apply to any rotor blade 42 at any point in its rotation about a central axis 26. Accordingly, it is typical to speak of a leading edge as that leading edge extends orthogonally to the direction of motion of a rotorcraft 10, sweeping in the direction of flight, with respect to the hub 40. Nevertheless, the leading edge actually rotates through a full 360 degrees continually during flight.

A pivot direction 119 represents a circumferential rotation around the axis represented by the direction 116. That is, for example, the direction 118 (e.g. 118a, 118b) is viewed within the plane formed by the directions 116 and 115. Likewise, the circumferential direction 119 exists within the plane formed by the directions 115 and 117.

The body 120 of the hub portion 102 represents the region that could have been formed as a completely smooth surface that appears aerodynamically static in a wind stream. For example, absent the shoulders 122, projections 122, or extensions 122 from the body 120, the cross section of the body 120 could be completely circular when viewed in a plan view along the axis of rotation 26. Nevertheless, the shoulders 122 or extensions 122 provide for the connection mechanisms and supporting actuators, lines, fluid handling, pitch-change horns and the like that operate to pivot the rotor blades 42 about their longitudinal 116 axes.

In the illustrated embodiment, each of the shoulders 122 or extensions 122 may itself be seen as an extension 122 from the body 120 by extending away from the central shape. Thus, as many blades 42 as extend from the hub 44 of the rotor 40 may benefit from a shoulder 122 or extension 122 formed therearound.

Figure 5:
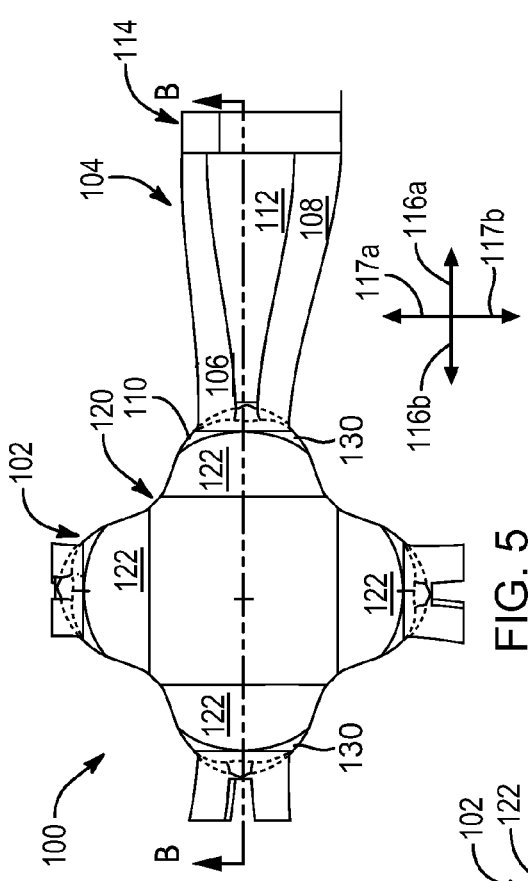
FIG. 5 is a top plan view thereof, with three of the blade fairings shortened for purposes of enlarging the image.
Figure 6:
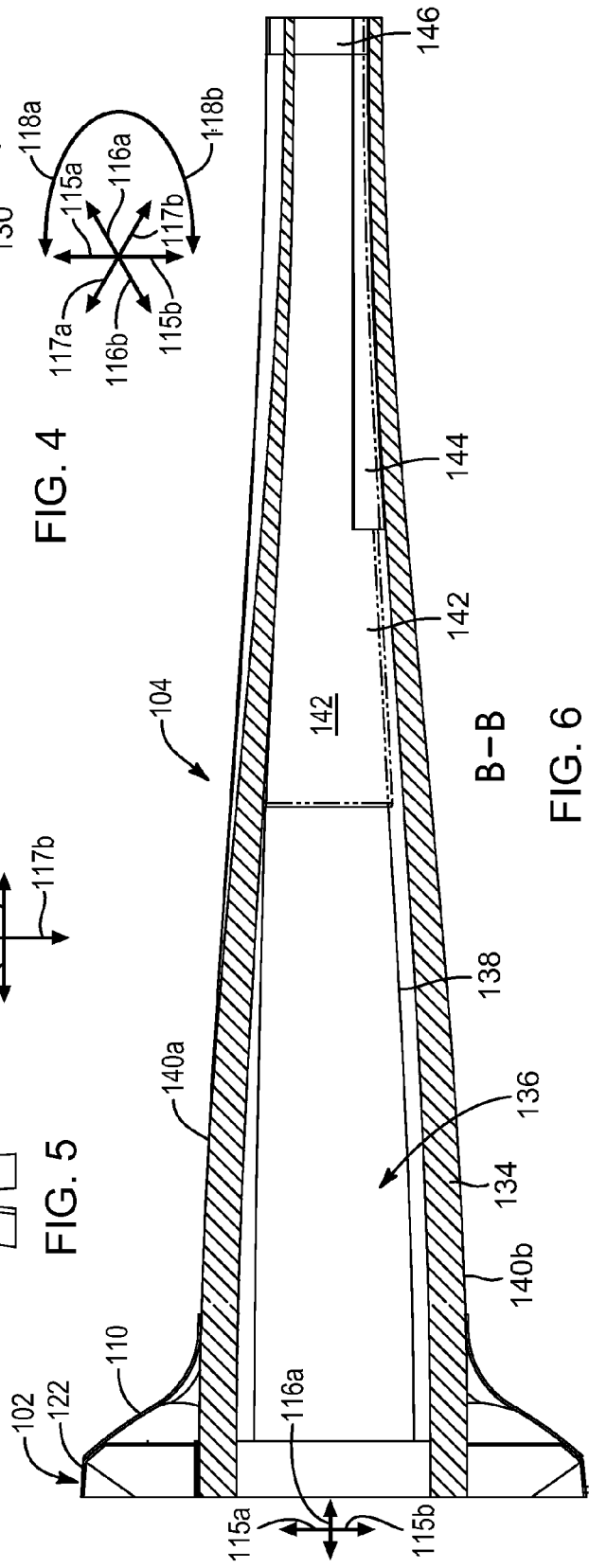
FIG. 6 is a front elevation cross sectional view of the blade fairing of the apparatus of FIG. 5.
Figure 7:
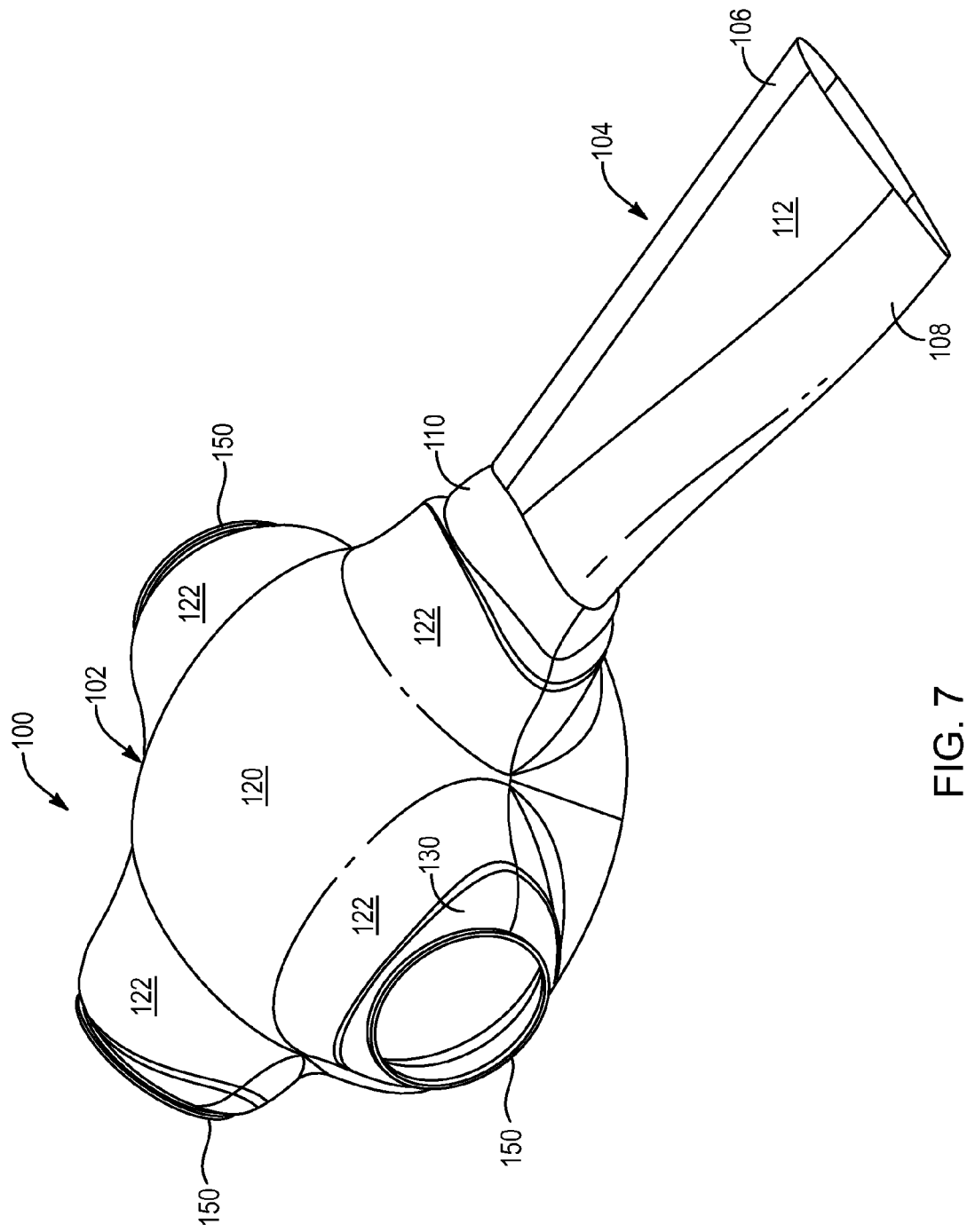
FIG. 7 is a perspective view of one embodiment of the hub fairing of FIG. 4 illustrated with a single blade fairing attached, in order to provide more detail.
Figure 8:
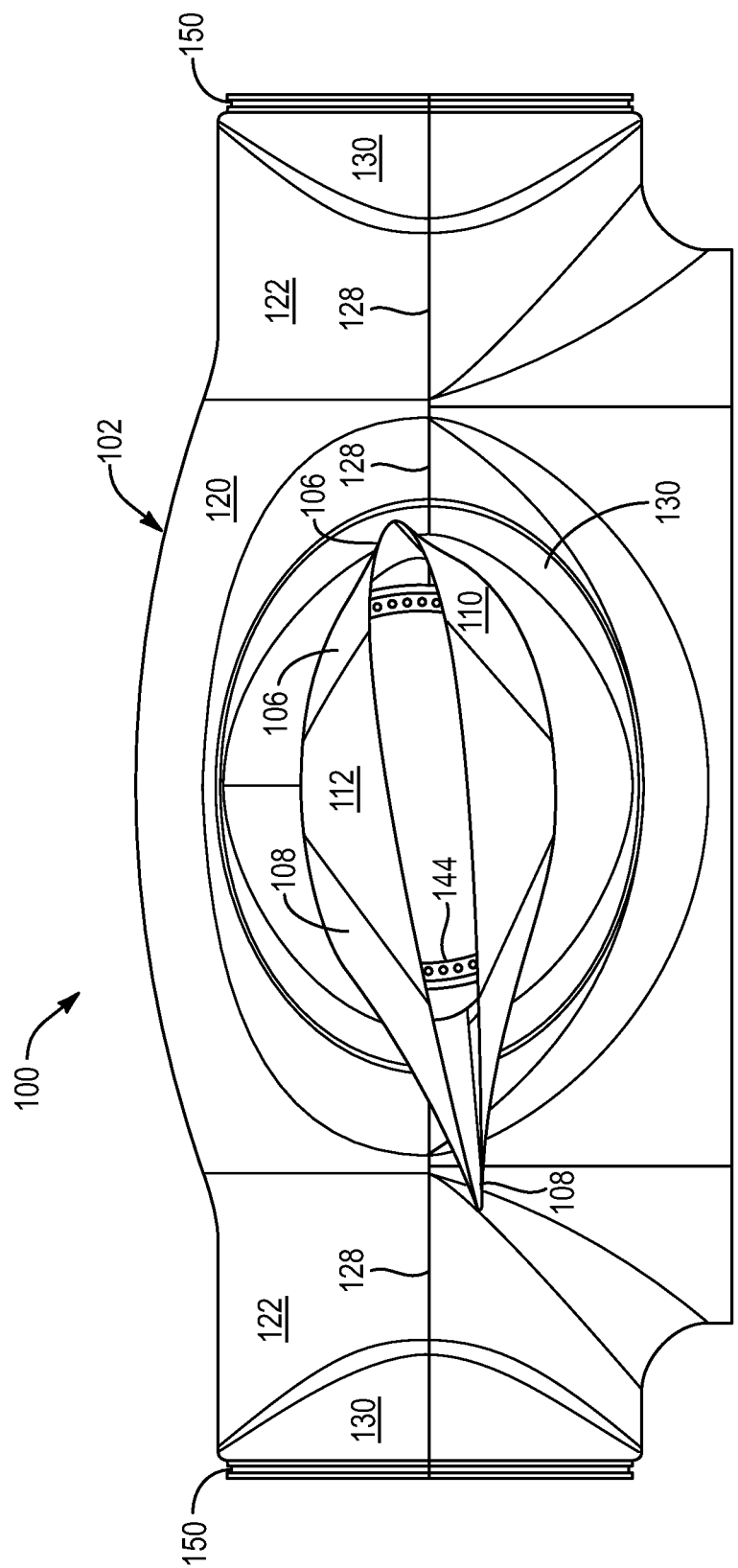
FIG. 8 is an end elevation view of the blade fairing of FIG. 7 with its associated hub fairing.
Figure 9:
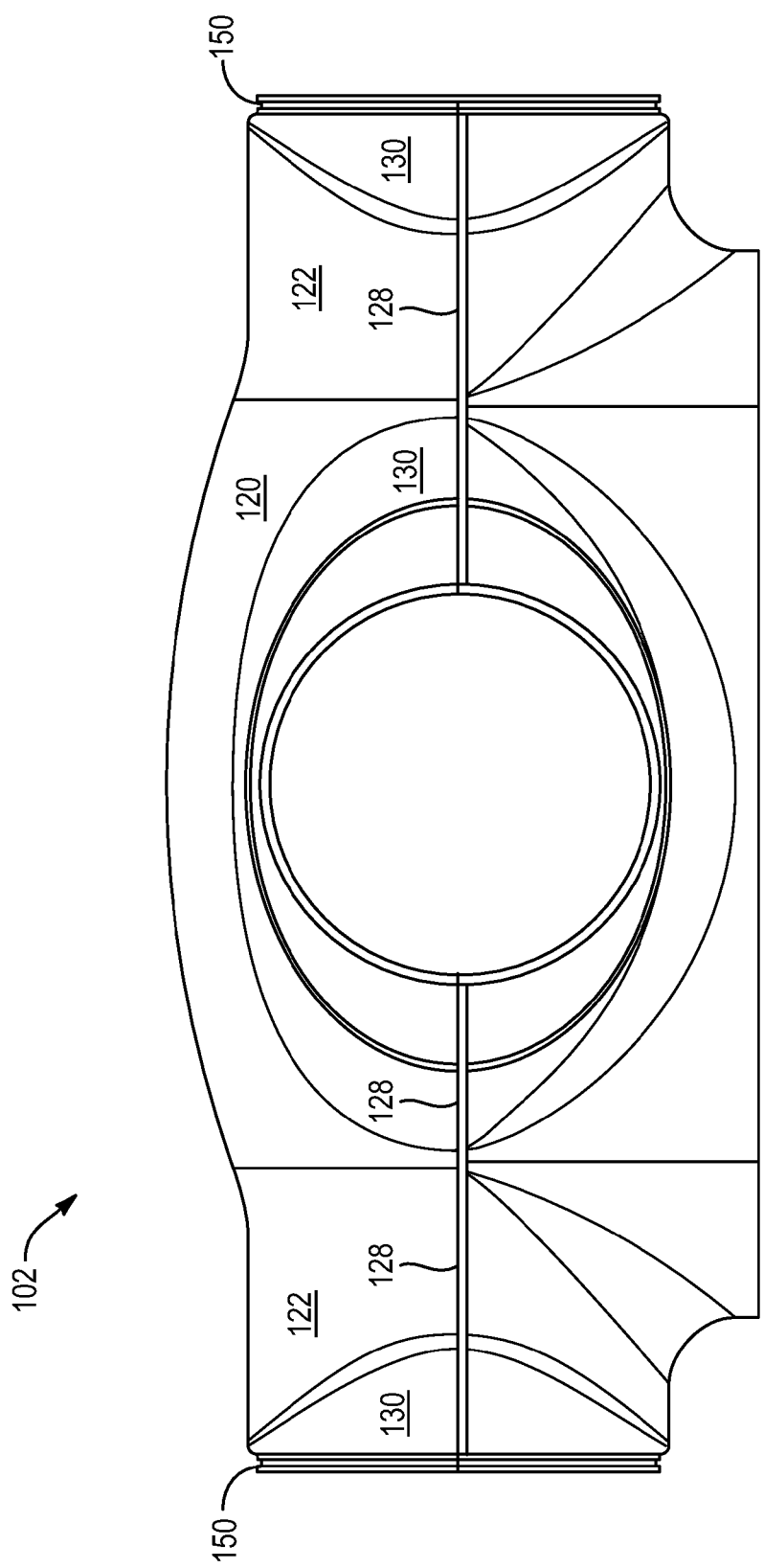
FIG. 9 is a back end elevation view of the hub of FIG. 8, the blade fairing being absent and not visible in this view.
Figure 10:
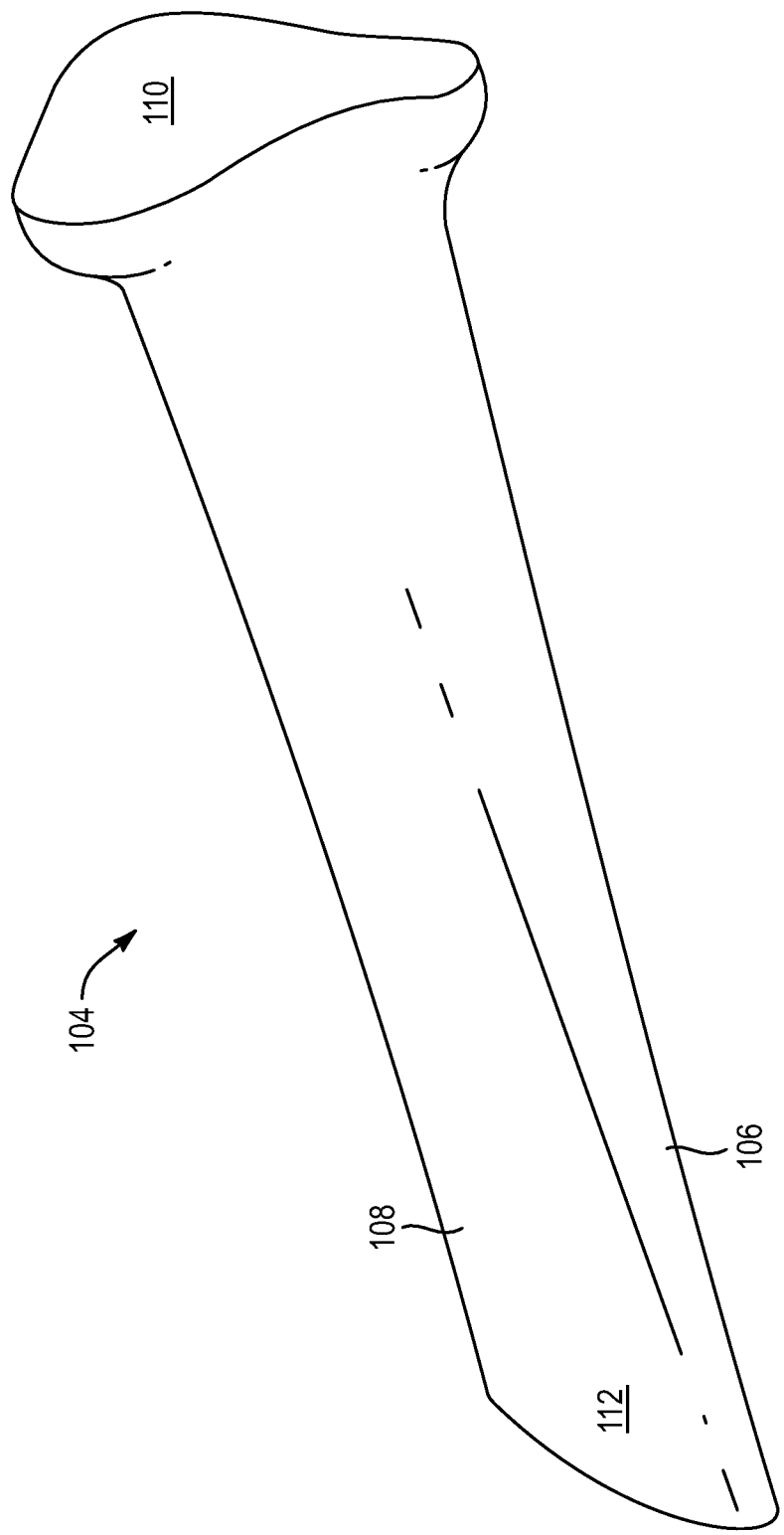
FIG. 10 is a perspective view of one embodiment of a blade fairing in accordance with the invention.
Figure 11:
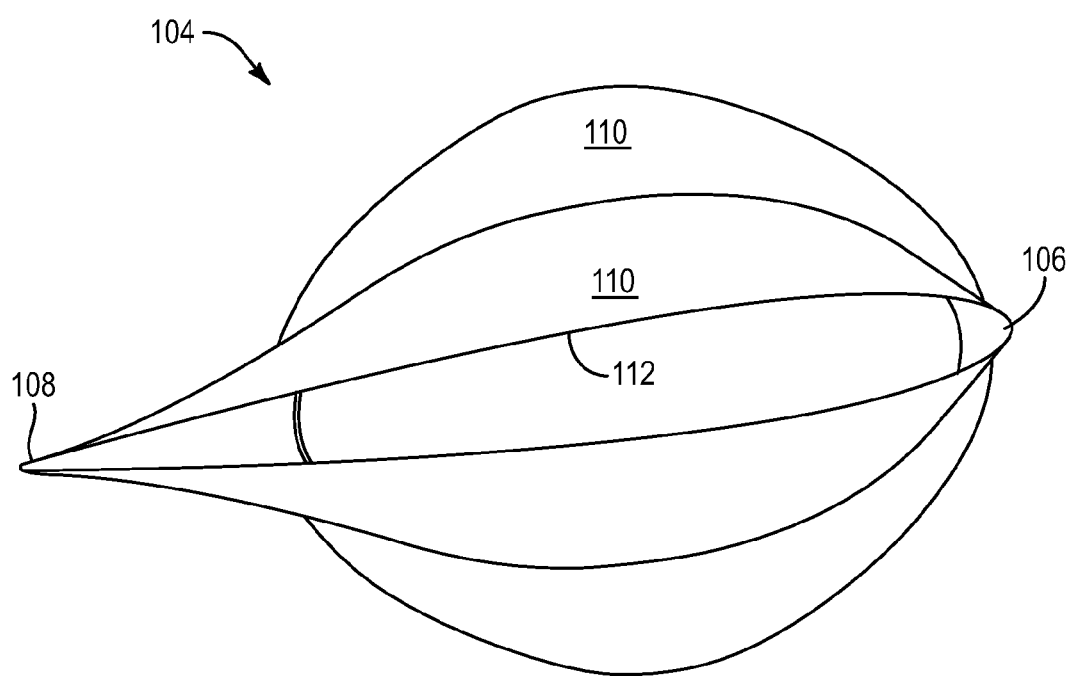
FIG. 11 is an end elevation view of the blade fairing of FIG. 10, wherein the envelope or contour of the blade itself between the portions of the blade fairing are also included.
Figure 12:
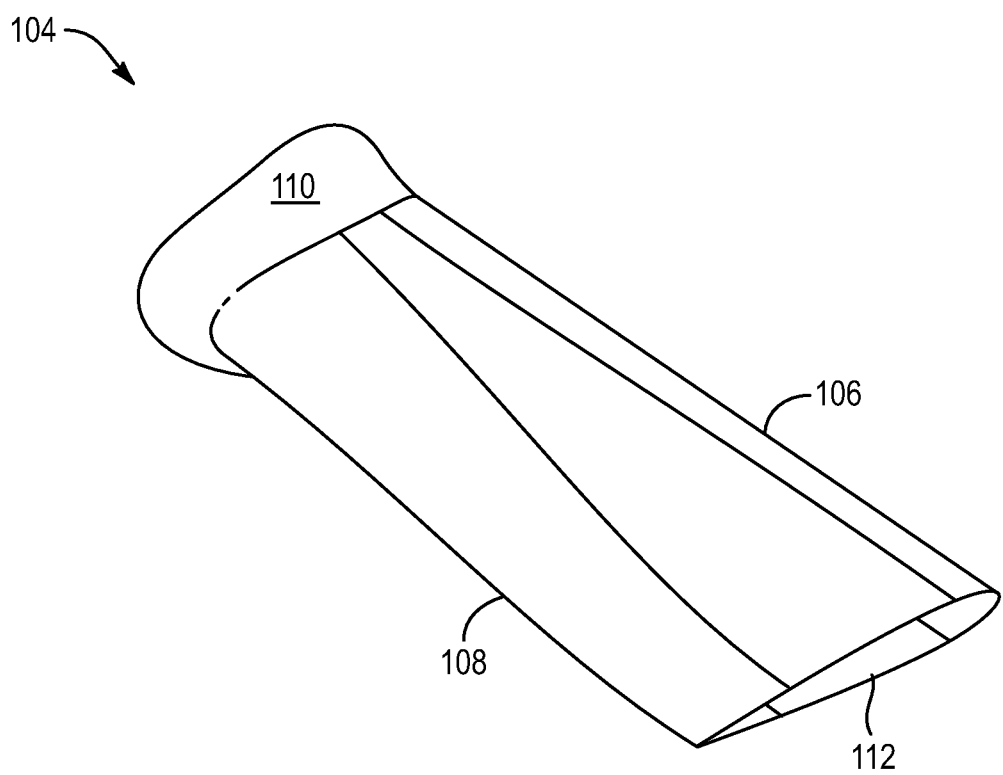
FIG. 12 is a perspective view from an opposite end of the fairing of FIGS. 10-11, illustrating the shape of the fairing with the blade, and consistent with the blade airfoil shape by the time the fairing has extended to its distal end away from the hub.
Figure 13:
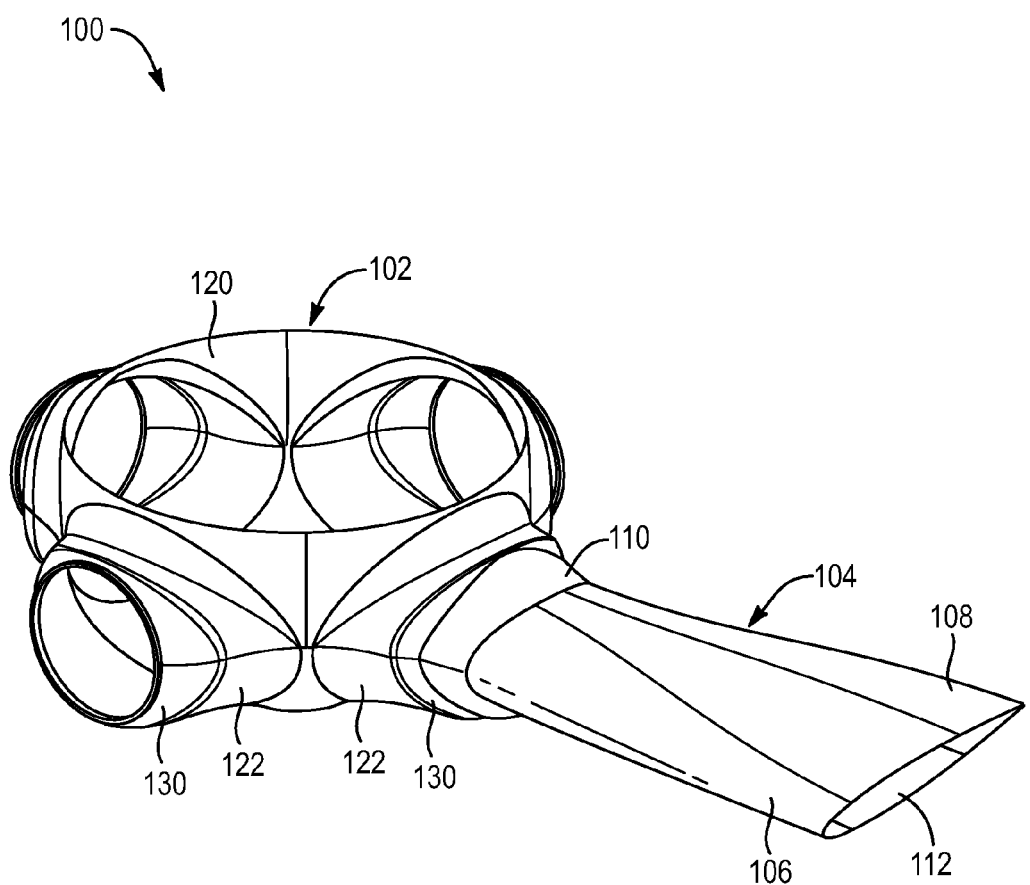
FIG. 13 is a perspective view of the underside of the portion of the hub and blade fairing of FIG. 8, illustrating the opening at which the hub fairing will interface with the fuselage or other fairing and cowling associated with the mast, the airframe, or both.
Figure 14:
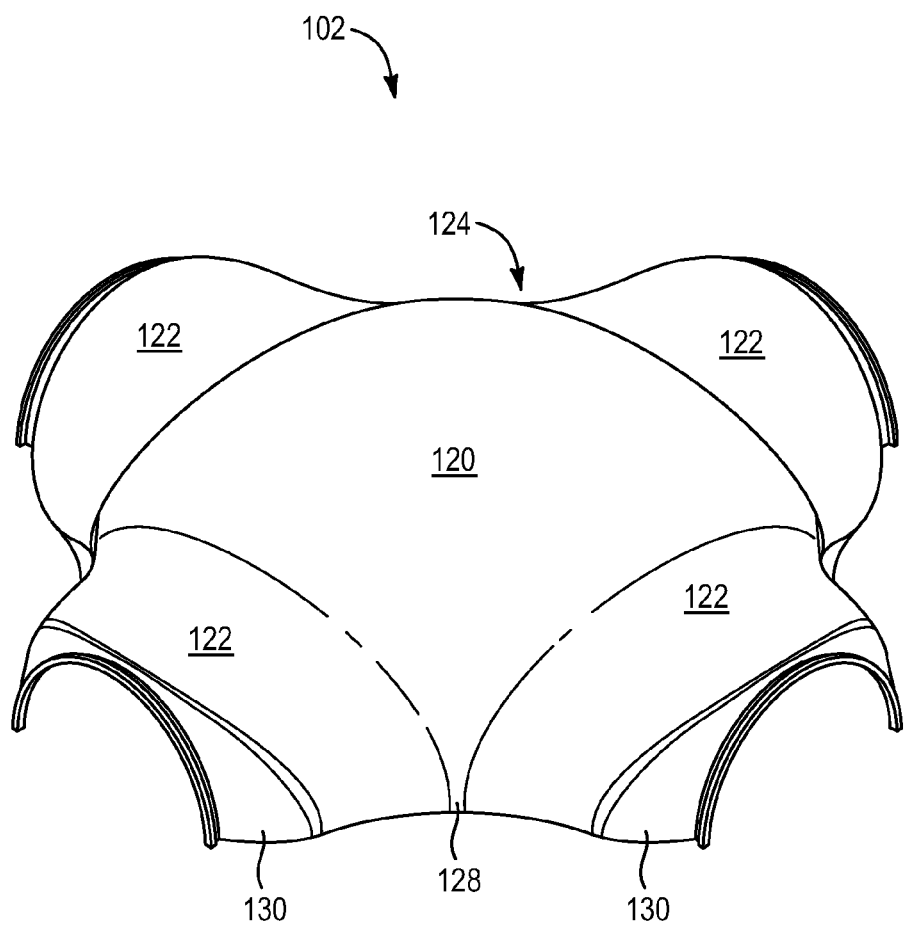
FIG. 14 is a perspective view of the upper portion of the rotor hub fairing.
Figure 15:
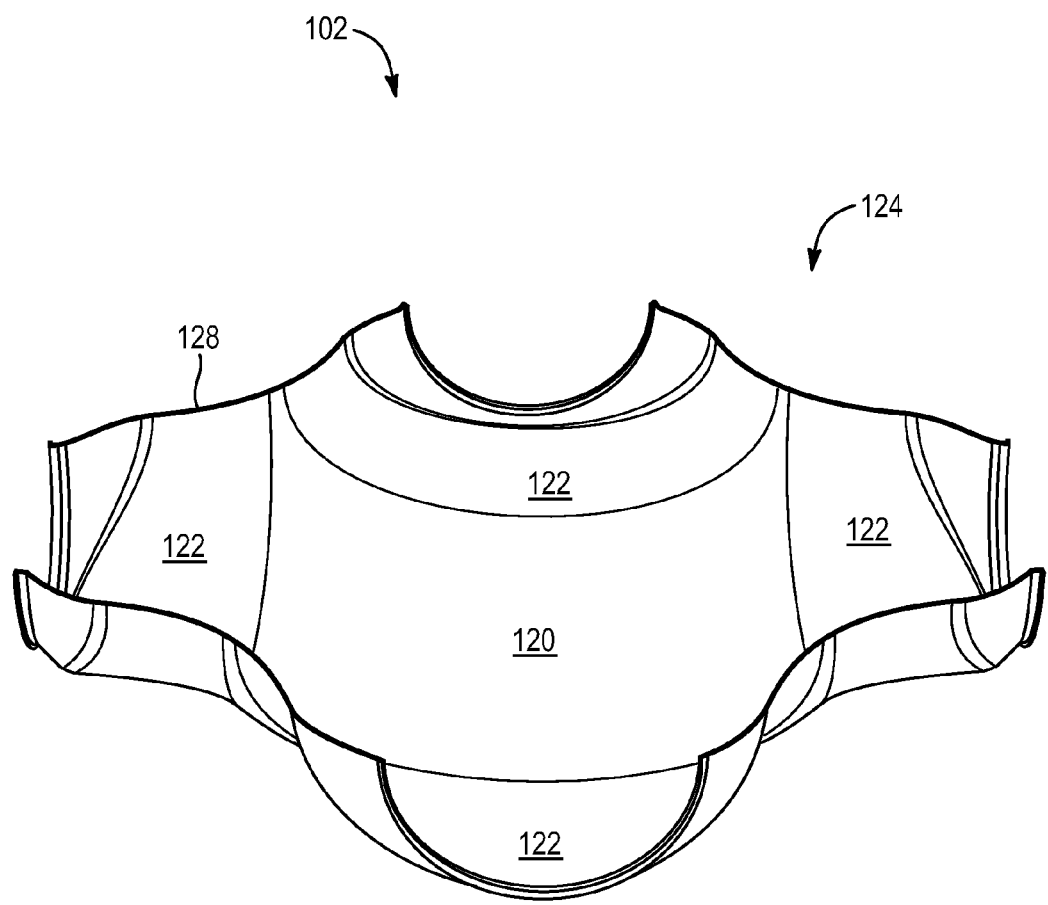
FIG. 15 is a perspective view of the underside of the upper half of the rotor hub fairing.
Figure 16:
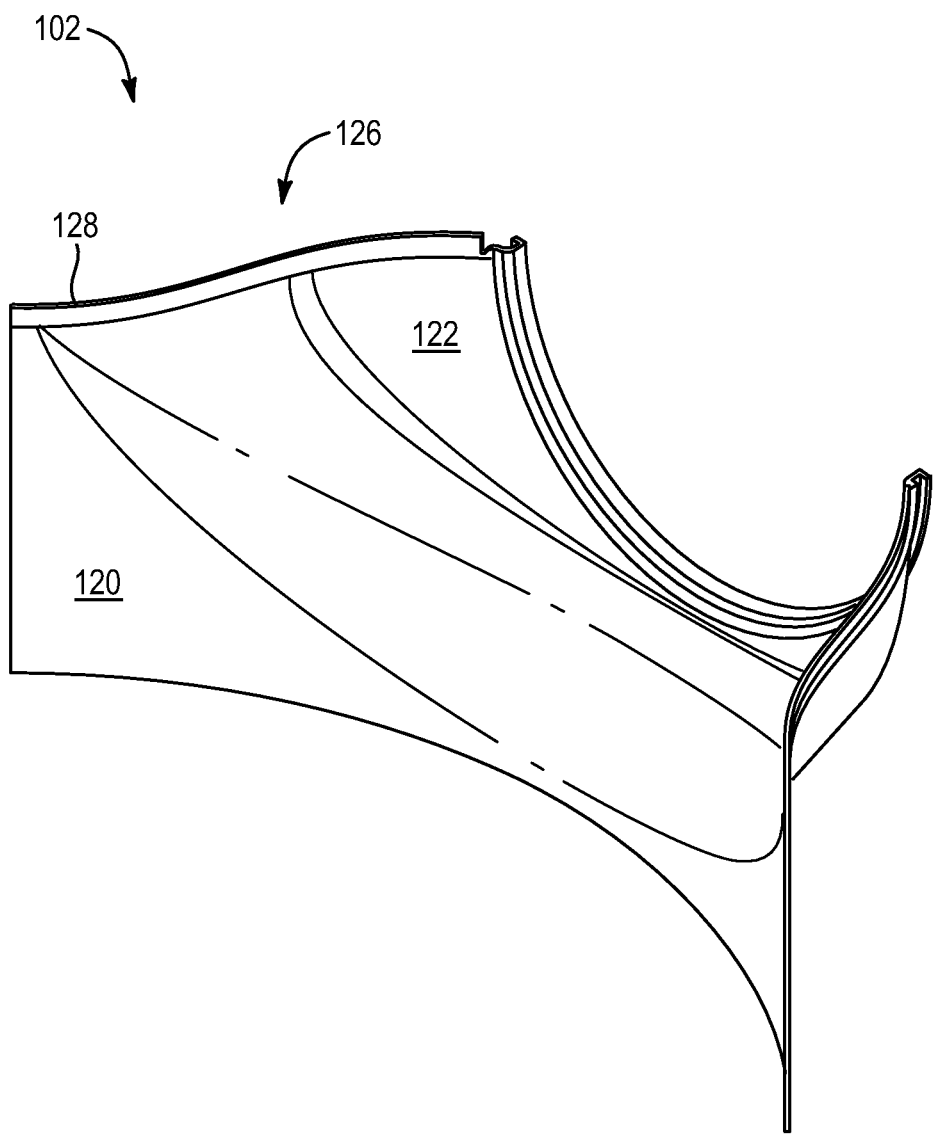
FIG. 16 is a perspective view showing a quarter of a lower section of the hub fairing of FIGS. 7-9 and FIGS. 13-15.

The spherical closure 130 or the spherical surface 130 is formed about a center of rotation 132 that exists hypothetically at some distance away, and may, but need not, exist at the center of the hub 44 and at the spatial center of the fairing system 100. This center of rotation 132 is the center with respect to which each of the directions 115, 116, 117, 118, 119, is defined. The center 132 of rotation, as illustrated in FIGS. 5 and 6, is that theoretical center about which pivoting of the blades 42 occurs, flapping of a blade 42 occurs, and lead-lag distortion occurs. Again, lead-lag movement may be distortion, some degree of freedom of motion, or both.

In general, referring to FIG. 6, while continuing to refer generally to FIGS. 1-16, a blade 42 may include a wall 134. In the illustrated embodiment, the wall 134 represents a wall 134 of the fairing 104 or blade portion 104 of the fairing system 100. Through the central portion of the root of each blade 42 passes a spar box cavity 136. That is, a spar, formed as a box or closed cross section will extend as a structural support member from the hub 44 out and along the blade 42.

Accordingly, a spar box cavity 136 is formed by, or to receive, the spar required to mechanically connect the hub 44 to the rotor blade 42 for support and for sustaining each of the forces imposed by flapping, lead-lag motion, and pivoting for blade pitch control. Typically, near an inside corner 138 of the spar box cavity 136, or spaced away therefrom, a shear web 142 may be added to stiffen the blade 42. The spar box cavity 136 and the wall 134 of the blade portion of the fairing system 100 may be further augmented by ribbed connectors 144 to provide connection, stiffness, or both. The shear web 142 may extend continuously or by attachment, to continue the shear web 142 within the root portion to a blade portion 146 thereof. Meanwhile, the flight surfaces 139 may actually be formed proximate the root of each blade 42 by a combination of a portion of the blade in the central portion 112, with the leading 106 and trailing 108 fairing portions or blade portions 104 ahead, and behind thereof, respectively.

In the illustrated embodiment, a seal fitting 148 receives a seal 150. The seal 150 extends from the opening in the extension 122 or shoulder 122 of the body 120, and seals against the internal surface of the cuff 110 of the blade portion 104 of the fairing system 100. Therefore, the seal 150 may touch the spherical inner surface of the cuff 110 of the blade portion 104 of the fairing system 100, or may connect substantially fixedly, with sufficient flexibility between the mating spherical surfaces 110, 130 in order to permit three degrees of freedom of motion of the cuff 110 and its connected blade portion 104 of the fairing system 100 with respect to the hub portion 102 of the fairing system 100. Accordingly, an inner, spherical surface of the cuff 110 pivots, and moves in three degrees of freedom with respect to the spherical closure surface 130 of the shoulder 122 of the body 120.

Referring to FIGS. 8-15, while continuing to refer to FIGS. 1-15, in one embodiment, the body 120 may be formed of an upper portion 124 separable from a lower portion 126. The line of demarcation along which the upper portion 124 and lower portion 126 may be connected may be characterized as a parting line 128. The parting line 128 may be formed to have a snap, seal, interface, substrate, or the like effecting securement of the upper portion 124 to the lower portion 126. In an alternative embodiment, some type of aerodynamic surface matching may occur proximate the parting line 128 in order that the upper portion 124 and lower 126 meet smoothly, thus avoiding excessive aerodynamic drag.

Nevertheless, in certain embodiments, the upper portion 124, the lower portion 126, or both of the body 120 may be secured by fasteners directly to some portion of the hub 44 with respect to which no relative motion is required. It is also preferable that the upper 124 and lower portion 126 be separable at a parting line 128 in order that the fairing system 100 may be removed from the hub 44 without requiring complete dismantling of the rotor 40.

For example, removing a blade 42 from the hub 44 may be a substantially labor intensive process. Removing a segment of the fairing system 100 formed of a smooth composite polymeric or fiber-reinforced polymeric material would be substantially simpler and more straightforward.

In certain embodiments, the lower portion 126 may also be formed in multiple pieces. No substantial advantage is gained by forming the upper portion 124 in more than a single piece. Structural integrity, simplicity of manufacture, minimizing inventory, and providing for suitable strength, wear, durability, and the like may better be served by forming the upper portion 124 of the body 120 as a single monolithic, individually molded piece.

By contrast, removing the lower portion 126 requires either removing the rotor 40 from the rotorcraft 10 or separating the portions of the lower portion 126 in order to remove them from around the mast 46 of the rotorcraft 10.

In the illustrated embodiment, a surface 130 or closure surface 130 formed on a shoulder 122 or extension 122 of the hub portion 102 of the fairing system 100 may be formed in a spherical shape. The spherical end 130 or closure 130 thereby provides a surface that can tolerate three degrees of motion with respect thereto, namely a flapping motion in the flapping direction 118, a lead-lag motion in that direction 117, as well as a pivoting motion in the pivoting direction 119 about the axis 116 extending longitudinally along each blade 42.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
   a rotorcraft comprising an airframe, a power plant connected to the airframe, and a rotor supported by the airframe, and powered by the power plant, the rotor comprising a hub portion and blades extending from the hub portion operating as rotary wings;
   a hub fairing completely enclosing the hub of the rotor against the airframe to provide a substantially completely enclosed aerodynamic structure about the hub;
   a blade fairing extending from proximate the hub fairing and extending along a blade presenting an aerodynamic shape, closed against flow therethrough by ambient air;
   the hub fairing further comprising a plurality of extensions, each extension including a convex spherical surface matched to a proximal surface of the blade fairing;
   the blade fairing further comprising a concave spherical surface disposed at the proximal end thereof and mated to the convex spherical surface of the hub fairing to substantially preclude passage of air therethrough; and a seal extending between the hub fairing and the blade fairing to resist entry of material into the space between the hub fairing and the blade fairing.

2. The apparatus of claim 1, wherein:

the rotorcraft is selected from an autogyro, a gyrodyne, a gyroplane, and a heliplane; and the seal is formed of an elastomeric material.

3. The apparatus of claim 1 wherein the rotor further comprises a pitch changing element operating to change the pitch of the blade, the pitch change element extending through the extension of the hub fairing without contacting the hub fairing.

4. The apparatus of claim 1 wherein the blade fairing is secured by fasteners to form a continuous aerodynamic surface with a portion of the blade, selectively removable therefrom without removal of the blade or the hub.

5. The apparatus of claim 1 wherein the airframe further comprises a skin disposed over the outside of the airframe to provide an aerodynamic surface, the skin providing with the hub fairing an enclosure, extending to the blades, substantially completely enclosing the hub therein.

6. The apparatus of claim 1 wherein the rotorcraft further comprises a control system extending through the airframe and into the rotor hub, the control system comprising actuators extending upward through the hub, and completely enclosed by the hub fairing and the airframe.

7. The apparatus of claim 1 further comprising the blade fairing having a base portion proximate the hub, and an end portion spaced away therefrom;

the hub fairing further comprising an extension opening formed to describe a circle and passing a root of the blade therethrough without contact; and the blade fairing, wherein the spherical surface is contoured to have a spherical radius less than a spherical radius corresponding to the face portion of the blade fairing, the difference in radii therebetween constituting a clearance between the blade fairing and the hub fairing during flight.

8. The apparatus of claim 7 wherein:

the rotorcraft further comprises a control system extending through the airframe and into the rotor hub, the control system comprising actuators extending upward through the hub, and completely enclosed by the hub fairing and the airframe; and the hub fairing is formed of portions, each selectively attachable and removable, to expose the control system for at least one of maintenance, repair, and inspection, without removal or disassembly of the rotor hub.

9. The apparatus of claim 8, wherein the hub fairing and blade fairing each comprise fasteners selectively securable thereto and removable therefrom to expose at least one of the top of the rotor hub, the bottom of the rotor hub, both the top and bottom of the rotor hub, and the blade root, in a manner adapted to at least one of maintenance, inspection, and repair.

10. The apparatus of claim 1, where each blade of the blades further comprise a blade spar extending through the hub fairing and blade fairing and rotatably mounting to the hub such that the blade spar is rotatable about an axis extending radially outwardly from the hub, the blade spar flexing responsive to flapping and lead-lag loads on the each blade.

11. A method for reducing aerodynamic drag on a rotorcraft, the method comprising;

providing a rotorcraft having an airframe, power plant, and rotor, the rotor including a hub portion and blade portion operating as rotary wings;

providing a hub fairing substantially enclosing the hub portion of the rotor between the hub fairing and the airframe, the hub fairing defining an outwardly facing convex surface;

providing a blade fairing mated to provide three degrees of freedom about a center of rotation, the center of rotation being within the hub fairing, in order to provide the three degrees of freedom of motion of the blade fairing secured to the blade portion of the rotor, without contacting the hub fairing, the blade fairing defining a concave surface interfacing with the outwardly facing convex surface of the hub fairing; and operating the rotorcraft;

operating the rotorcraft with vertical flapping motions of the blades with respect to the hub;

operating the rotorcraft with lead-lag bending of each of the rotor blades with respect to the hub; and pitching each of the blades at a variety of angles between a maximum angle of attack and a minimum angle of attack by pivoting the blades with respect to the hub, the blades pivoting without contact with the hub fairing.

12. A method of controlling aerodynamic drag on a rotorcraft, the method comprising providing a rotorcraft having airframe, power plant, and a rotor, the rotor further comprising a hub having airfoils extending therefrom and operating as blades providing lift to the rotorcraft;

providing a hub fairing to reduce the aerodynamic drag on air passing by the hub, by directing air around the outside of the hub, and restricting air against passing through the hub, the hub fairing defining an outwardly facing convex spherical surface;

providing a blade fairing extending around a root of a blade, the blade fairing matingly fitted to an extension of the hub fairing, the extension terminating in a concave spherical surface, and the blade fairing having a base beginning with the spherical surface, the outwardly facing convex spherical surface of the hub and the spherical surface of the blade being matched to move in three degrees of freedom with respect to one another without contact, the outwardly facing convex spherical surface being inserted within the concave spherical surface.

13. The method of claim 12 further comprising providing an elastomeric seal extending between the spherical surface of the hub fairing and the corresponding surface of the spherical blade fairing.

14. The method of claim 13 further comprising providing the elastomeric seal, wherein the seal is a convoluted bellows providing three degrees of freedom of motion between a first end of the bellows and a second end of the bellows, the first end being connected to the hub fairing and the second end being connected to the blade fairing.

15. The method of claim 12 further comprising assembling the blade fairing from at least two separate components.

16. The method of claim 15 further comprising disassembling the blade fairing into at least the two separate components.

17. The method of claim 12 further comprising disassembling the hub fairing into at least the two separate components.

18. The method of claim 12 further comprising:

the providing a hub fairing, further comprising providing a top portion and a bottom portion thereof, the bottom portion comprising at least two selectively attachable and detachable portions;

removing the bottom portion from the hub; and servicing the hub.

19. The method of claim 18 further comprising:
the providing a blade fairing, further including providing an airfoil positionable around a root of a blade of the blades to form an airfoil therearound; and
servicing the blade root by removing the blade fairing, without removing the blade from the hub.

20. The method of claim 19 further comprising substantially completely enclosing the hub and blade roots of the blades by assembling the hub fairing and blade fairing about the hub and blades respectively, without removal of the hub or blade.

\* \* \* \* \*